Aug. 25, 1953  R. C. HARRISON  2,650,110
ELECTRICAL CONDUIT CONNECTOR
Filed July 31, 1950  2 Sheets-Sheet 1
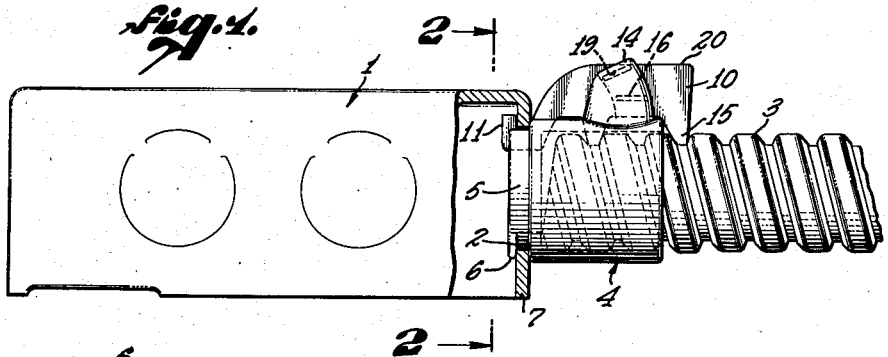
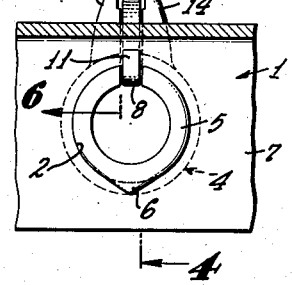
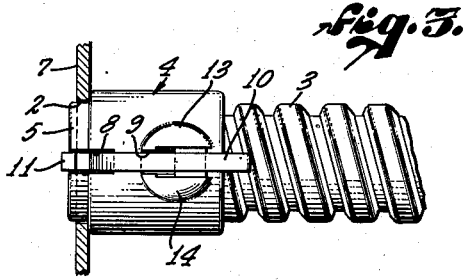
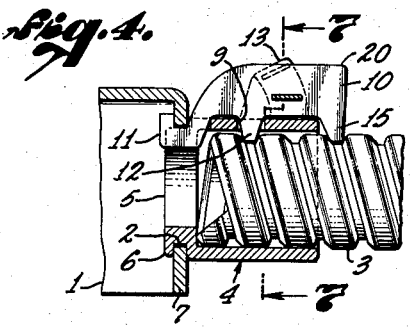
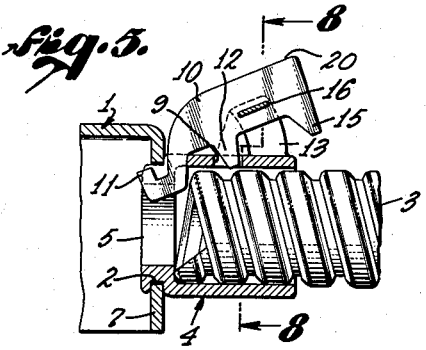
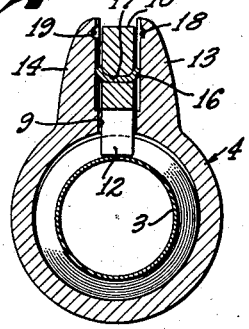
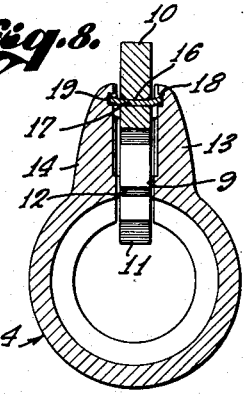
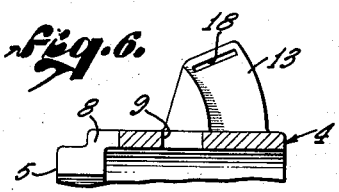
ROBERT C. HARRISON,
INVENTOR.
BY
ATTORNEY.

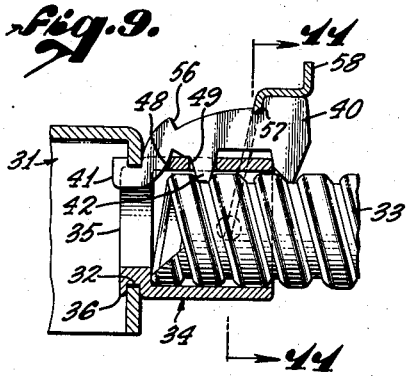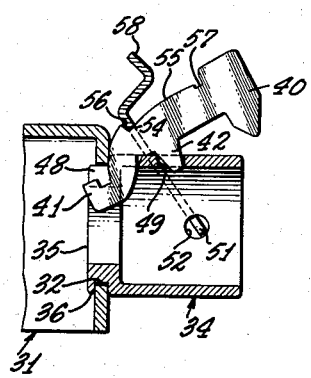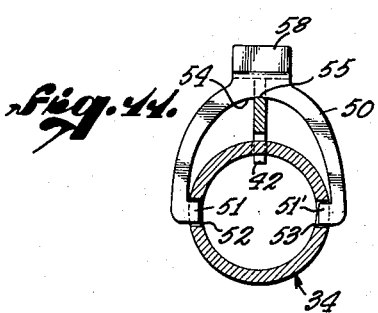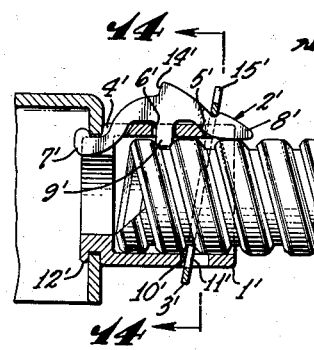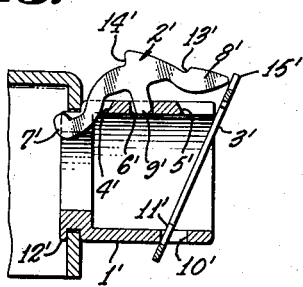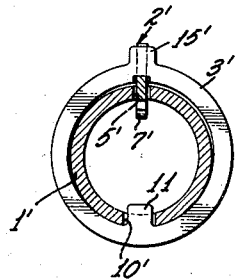

Patented Aug. 25, 1953

2,650,110

UNITED STATES PATENT OFFICE 2,650,110

ELECTRICAL CONDUIT CONNECTOR

Robert C. Harrison, Santa Monica, Calif.

Application July 31, 1950, Serial No. 176,833

15 Claims. (Cl. 285—6.5)

1

This invention relates to a connector for fastening electrical conduit or cable to electrical outlets or junction boxes.

My invention provides an improved connector for fastening electrical conduit or cable to an electrical outlet or junction box particularly with respect to the elimination of difficulties involved in putting the connector in place. The connector of my invention provides a relatively simple structure which in addition to being very effective for making a substantial connection of conduit or cable to an outlet or junction box also is very easy to put in the desired position for making the desired connection. Moreover my invention also reduces the time required to perform the fastening operation, particularly by eliminating the need for a lock nut now commonly used, provides a means for performing the fastening operation entirely from outside the outlet or junction box, provides a means for performing the fastening operation without the use of special tools, reduces the amount of space occupied inside the outlet or junction box by the connector and provides a connector so arranged that the assembled parts thereof will remain assembled as a unit during packing, shipping and handling, until it is finally used for its intended purpose.

My invention will be more particularly described and illustrated by reference to the accompanying drawing in which:

Figure 1 is a view showing one form of a connector of my invention fastening an electrical conduit to a junction box.

Figure 2 is a view on the line 2—2 of Figure 1 showing the connector extending into the inside of the junction box.

Figure 3 is a plan view of Figure 1 with most of the junction box omitted.

Figure 4 is a view taken on the line 4—4 of Figure 2 showing the connector fastened to the junction box and holding the conduit in fixed position.

Figure 5 is a view similar to Figure 4 but with the locking means for fastening the connector to the junction box and holding the conduit in fixed position in open position, before being forced into fastening position.

Figure 6 is a sectional view of the upper portion of the connector taken along the line 6—6 of Figure 2.

Figure 7 is a sectional view along the line 7—7 of Figure 4.

Figure 8 is a sectional view along the line 8—8 of Figure 5.

2

Figure 9 shows a modification of a connector in accordance with my invention showing a conduit connected to a junction box with the connector in fastened position.

Figure 10 is a view similar to Figure 9 with conduit omitted and the connector in open or unfastened position.

Figure 11 is a sectional view taken along the line 11—11 of Figure 9.

Figure 12 is a view similar to Fig. 9 of another modification showing the connector in fastened position.

Figure 13 is a view similar to Figure 12 with conduit omitted and the connector in unfastened position.

Figure 14 is a sectional view along the line 14—14 of Figure 12.

The connector of this invention consists essentially of two parts, one a substantially tubular body portion or sleeve, one end of which is adapted to fit into the usual hole in an outlet or junction box, and at the other end is adapted to receive an electrical conduit or cable within the other end, and the other part comprising a means in the form of a rocker member cooperating with and fitting into said body portion for simultaneously locking the connector to the outlet or junction box and fastening the conduit in position within the body portion. It is an important feature of my invention that this means is a unitary element with dual function which when forced into fastening position locks the connector to the junction box and securely holds the conduit within the body portion of the connector.

The connector of my invention will be particularly illustrated by reference to Figure 1 which shows at 1 a customary junction box having the usual hole 2 and at 3 a conduit of the flexible type. At 4 is shown the body portion or sleeve of the connector of my invention having a neck portion 5 adapted to fit within the hole 2 of the junction box. Extending downwardly from the neck 5 is downwardly extending projection or lip 6 adapted to fit over wall 7 of the junction box 1. At the top of the body portion 4 is provided a slot 8 and hole 9 adapted to receive downwardly projecting portions of fastening lever 10. Locking member or hook 11 of fastening lever 10 extends downwardly in slot 8 and fulcrum member 12 extends loosely into hole 9. Extending upwardly from the body portion or sleeve 4 on each side of the fastening lever 10 are upwardly extending projections 13 and 14 between which fastening lever 10 fits and between which the fastening lever is adapted to move down into fastening position, as illustrated in Figure 5 and Figure 4 respectively.

With particular reference to Figure 4, it will be observed that locking member 11 of fastening lever 10 is adapted to engage the edge of wall 7 through hole 2 when in locking position and at the same time fulcrum member 12 of fastening lever 10 firmly presses the cable 3 downwardly within the inside of body portion 4 so that with the upward force of locking member 11 against the edge of wall 7 and with the downward force of fulcrum member 12 upon the cable 3, the body portion 4 in cooperation with projection 6 is fixed to the junction box while at the same time the conduit 3 is firmly held within the body portion 4. Auxiliary projection 15 may also be provided on fulcrum member 10 as shown to additionally engage the cable 3 outside the body portion 4.

In order to hold fastening lever 10 in open or unfastened position on the body portion 4 prior to use, such as during packing, shipping and handling, a steel spring 16 extends through hole 17 in fastening lever 10, said steel spring extending outwardly on each side thereof a sufficient distance to engage grooves 18 and 19 on the inside of upwardly projecting members 13 and 14. The outwardly extending portions of this spring cooperate with grooves 18 and 19 in such a manner that when locking member 11 and fulcrum member 12 are fitted respectively into slot 8 and hole 9, the spring 16 can be pushed into position into grooves 18 and 19 by pushing fastening lever 10 downwardly between upward projections 13 and 14 until it snaps into position as shown in Figures 5 and 8. Once the connector of my invention is fitted into a hole of a junction box and the conduit is fitted within the body portion 4, all as shown in Figure 5, the connector may be locked to the junction box and the cable held firmly within the body portion of the connector by forcing the fastening lever 10 downwardly into the position shown in Figure 4. As this is done steel spring member 16 is forced downwardly between the inside walls of upward projections 13 and 14 and the two ends of said spring are curved slightly upwardly and tend to engage or bite into these inner walls on any tendency toward upward motion of the fastening lever 10 and in this manner lock the fastening lever in fastening position as shown particularly in Figure 4 and Figure 7. The forward portion of the inner walls of the upwardly extending projections 13 and 14 are preferably sufficiently close together to somewhat closely guide the lever 10 in its movement up or down.

In operation the connector of my invention is packed, shipped and handled and ready for use in the position shown in Figure 5 and in Figure 8. In this position it is fitted into a hole in an outlet or junction box and the cable or conduit is fitted within the body portion of the connector all as shown in Figure 5. The fastening lever 10 can be forced into fastening position by applying force at the top of the fastening lever near 20 and this may be conveniently done simply by applying a pair of pliers at 20 and the underside of body portion 4, for example. This makes both a firm mechanical and electrical connection, that is, ground connection, to the box.

It can be seen that the fastening lever 10 is a rocker member that has a leading end 11 for engagement with the box 1 and from a starting position shown in Fig. 5 first rotates about a forward fulcrum against the sleeve 4 until its intermediate fulcrum portion 12 contacts the cable 3. Thereafter the rocker member 10 pivots on its fulcrum portion 12 as its rearward actuating end is forced toward the cable to bring the rocker member to its final locking position. At the final locking position of the rocker 10 locking or securing force applied against the rearward actuating end of the rocker member results in a reaction force by the rocker member against the cable for positive engagement with the cable and simultaneously results in reaction force on the part of the leading end 11 of the rocker member for positive engagement with the box 1.

Figures 9 to 14 show two modifications in which other means than the curved spring are employed to hold the fastening lever in position.

One such modification of my invention is shown in Figures 10 and 11. Here a junction box is shown at 31 having a hole therein 32. A cable is shown at 33 fitted within the body portion 34 of the connector having a neck 35 adapted to extend within the hole 32 with a downwardly projecting lip 36. Fastening lever 40 has locking member 41 and fulcrum member 42 substantially similar to the modification described above. The upper part of body portion 34 has slot 48 and hole 49 into which locking member 14 and fulcrum member 42 respectively extend. Holding fastening member in position in slot 48 and hole 49 in yoke member 50 having two projections 51 and 51' adapted to extend in holes 52 and 53 respectively, in the sides of body portion 34. Yoke member 50 is adapted to extend about and above the upper part of body portion 34 and fastening lever 40. The inside 54 of yoke member 50 is adapted to ride on the upper surface 55 of fastening lever 40 and in open position rests on abutment 56 and in closed position locks in notch 57.

In operation or in use, the connector assembled as shown in Figure 10 is fitted within a hole or outlet in a junction box as illustrated in Figure 10 and then the cable or conduit is fitted within the body portion 34. By handle 58 on yoke 50 the yoke is forced from the position shown in Figure 10 to the position shown in Figure 9 to simultaneously lock the connector to the box and force fulcrum element 42 down upon cable 33 to press it tightly against the inside of the bottom of body portion 34 to hold it securely in position. In the event it is desired to disconnect yoke member 50 may be pushed back into the position shown in Figure 10.

Still another modification of my invention is shown in Figures 12, 13, and 14.

Here the body 1' of the connector is similar in general shape to the body of some types of conduit connectors now in use, but with two slots 4' and 5' provided in the top of the body in line with each other and at opposite ends thereof, and a hole 6' is provided in line with and approximately midway between the two slots. These slots, 4' and 5', and the hole 6', between them are for receiving the lever 2'; the ends 7' and 8' of the lever fitting into the two slots 4' and 5' respectively, and the projecting fulcrum 9' fitting loosely into the hole 6'. Another hole 10' is provided in the bottom of the body for receiving the inwardly projecting point 11' of the locking ring 3'. A lip 12' is provided on the bottom of the smaller end of the body to assist the hook 7', to hold the assembled connector in place after it has been inserted into the opening in an outlet or junction box.

The lever 2' is of the peculiar shape illustrated in order to incorporate into it the following features; the hook 7', which, in cooperation with the lip 12' on the body, holds the connector in place in the opening of an outlet or junction box; the projecting fulcrum 9', which presses into the top of the conduit and, in cooperation with the projecting point 11' on the locking ring 3', holds the conduit securely fastened to the connector; the tapered end 8' over which the locking ring 3' can be forced so as to squeeze the fulcrum 9' down against the conduit and the opposite or hook end 7' up into position inside the opening in the outlet or junction box; the notch 13' into which the locking ring 3' comes to rest to lock the parts together; and the lug 14' against which one jaw of a pair of pliers can be placed to aid in squeezing the locking ring into position.

The locking ring 3' is provided with a lug 15' at its top against which the other jaw of the pliers referred to just above can be placed to aid in squeezing the locking ring into position and with an inwardly projecting point 11' at the bottom which presses into the conduit in opposition to the fulcrum 9' on the lever 2'. This projecting point 11' being placed through the hole 10' in the body of the connector also holds the locking ring in place longitudinally with respect to the connector body.

The operation of the device is as follows: In the form of invention illustrated, it is assumed that the workmen using it will receive it with all parts assembled together as illustrated in Figure 12 without box and conduit. First then, the locking ring 3' is withdrawn from the notch 13' back to the position in which it is illustrated in Figure 13 without the box. Next, the tapered end 8' of the lever 2' is raised and the hook 7' is depressed until it is entirely within the slot 4' at the smaller end of the body 1'. The three parts are now in the relative positions illustrated in Figure 13. The conduit or armored cable is next inserted through the locking ring 3' into the larger end of the body 1' and held in place inside the connector while the smaller end of the connector is inserted into the opening in the outlet or junction box. In this movement the lip 12' on the bottom of the smaller end of the connector body, is hooked down over the lower part of the opening in the outlet or junction box. The tapered end 8' of the lever is then depressed as far as possible with a thumb or finger, the fulcrum 9' presses against the conduit or armored cable the resistance of which causes the hook 7' to be raised until it hooks inside the top part of the opening in the outlet or junction box. Finally, the locking ring 3' is slipped up over the tip of the tapered end 8', of the lever 2', and, by means of pliers or similar tool whose jaws are placed around the lugs 14' and 15' the locking ring 3' is squeezed forward along the tapered end until it comes to rest in the notch 13'. As the top of the locking ring 3' is forced forward, as just described, along the tapered end 8' of the lever 2' it squeezes the projection 11' and the fulcrum 9' into the conduit or armored cable from opposite sides, and simultaneously increases the upward pressure of the hook 7' against the top edge of the opening in the outlet or junction box, thus securely locking the connector as a whole to both the conduit and the outlet box, and forming a firm mechanical and electrical connection of the conduit to the box.

The connectors of my invention although illustrated above may be used for other types of conduit or cable. Suitable modifications such as the addition of plates or a sleeve inside the connector body would make it suitable for use with unarmored electrical cable or portable electric cords, the plates or sleeves being used to prevent damage to the cable or cord. The sharpening of the points which grip the conduit and the fabrication of these points with sufficiently strong material would make the connector more suitable for use with electrical metallic tubing or with rigid iron conduit.

While I have illustrated and described my invention in detail, it is to be understood that various changes may be made therein by those skilled in the art without departing from the spirit of the invention as defined in the appended claims.

I claim:

1. A connector for fastening an electrical conduit into an opening therefor of a junction box comprising a sleeve to receive said conduit, said sleeve having an end portion adapted to enter said junction box opening from the outside of said junction box for engagement between the sleeve and box, having a slot at said end portion extending lengthwise of said sleeve, and having a hole spaced lengthwise from said slot; a rocker member extending along the periphery of said sleeve from said end portion in said slot and over said hole with said rocker member accessible from the outside of said junction box when said end portion is within said junction box opening, said rocker member being rotatable about that portion of said sleeve between said slot and said hole from a starting position permitting said end portion of the sleeve to enter said junction box opening to a locking position to fasten the end portion within said box opening, said rocker member having a leading end carrying a hook member adapted to hook onto a portion of the junction box wall adjacent said junction box opening, said leading end being retracted within said end portion of said sleeve at the starting position of said member and swung outward for locking engagement of said hook member with the wall of said junction box adjacent said opening at the locking position of said member, the other end of said rocker member having a first position swung out from the circumference of said sleeve at the starting position of said member and a second position toward said sleeve at the locking position of said member, said rocker member having an intermediate projecting portion retracted outwardly at said starting position of said member and extending through said hole within the inner circumference of the sleeve for engagement with said conduit at the locking position of the member; and means to secure said other end of the rocker member at said second position thereby holding said rocker member at its locking position with said leading end in engagement with the box and said intermediate portion in engagement with the conduit thereby interlocking the box, sleeve and conduit.

2. A connector for fastening an electrical conduit into an opening therefor in an electrical junction box comprising: a sleeve to receive said conduit, said sleeve having an end portion adapted to be easily inserted into said opening therefor in an electrical junction box for engagement between the sleeve and box, having a slot at said end portion extending lengthwise of said sleeve and having a hole located axially in line with said slot intermediately between said slot and the opposite end of said sleeve; a rocker member extending axially along the periphery of said sleeve from said slot in said end portion to the opposite end of said sleeve, said rocker member having a leading end carrying a hook element adapted to fit movably into said slot in said end portion of said sleeve, and having an intermediate inwardly projecting portion adapted to fit movably into said hole in said sleeve, said rocker member being rotatable about that portion of said sleeve between said slot and said hole from a starting position, said hook element at said leading end is depressed within said slot in said end portion of said sleeve, thus permitting said end portion to be easily inserted into an opening therefor in an electrical junction box, said other end of said rocker member is extended outwardly away from the periphery of said sleeve, and said intermediate inwardly projecting portion is within said hole in said sleeve but not projecting through said hole to the interior of said sleeve, thus permitting the end of an electrical conduit to be easily inserted into said sleeve, and wherein, in said locking position, said hook element at said leading end is projected outwardly from said slot thus hooking onto a portion of the junction box wall surrounding the opening therein, said other end of said rocker member is retracted inwardly against the periphery of said sleeve, and said intermediate inwardly projecting portion is projected through said hole in said sleeve into the interior of said sleeve to rest upon the conduit inserted into said sleeve for effecting engagement between the sleeve and conduit; and a securing means to secure the said other end of said rocker member when said rocker member is in its said locking position with said leading end in engagement with the wall of the junction box opening and said intermediate portion in engagement with the conduit, thereby interlocking the box, sleeve and conduit.

3. A connector as set forth in claim 1 in which said end portion of the sleeve has a radially extending lip to engage said box from the inside, said lip being positioned diametrically opposite from said leading end of said rocker member.

4. A connector as set forth in claim 1 in which said rocker member fulcrums on said intermediate portion at its locking position whereby the rocker member reacts to force applied at said other end by pressing against said conduit at said intermediate portion and pressing against said box at its leading end.

5. A connector as set forth in claim 4 in which said rocker member is adapted to fulcrum on said sleeve forward of said intermediate portion of the rocker member in its initial movement from said starting position and to fulcrum on the conduit at said intermediate portion in its locking position.

6. A connector as set forth in claim 1 in which said other end of the rocker member is adapted to contact said conduit at said locking position of the rocker member.

7. A connector as set forth in claim 6 in which said other end of the rocker member is adapted for positive engagement with said conduit at said locking position of the rocker member.

8. A connector as set forth in claim 1 in which said securing means connects said other end of the rocker member with said sleeve.

9. A connector as set forth in claim 8 in which said rocker member extends between two outward projections of the sleeve and said securing means interlocks said rocker member with said two projections.

10. A connector as set forth in claim 9 in which said securing means is in the form of a short transverse spring bowed between said projections for endwise engagement therewith.

11. A connector as set forth in claim 1 in which said securing means is adapted to pivot from an ineffective position to an effective securing position.

12. A connector as set forth in claim 11 in which said securing means is pivotally connected with said sleeve.

13. A connector as set forth in claim 1 in which said securing means engages both said other end of the rocker member and said conduit.

14. A connector as set forth in claim 13 in which said securing means is in the form of a ring extending around said cable.

15. A connector as set forth in claim 14 in which said ring extends through an opening in said sleeve to pivot against said conduit.

ROBERT C. HARRISON.

References Cited in the file of this patent

UNITED STATES PATENTS

| Number | Name | Date |
|---|---|---|
| 1,644,306 | Ledbetter | Oct. 4, 1927 |
| 1,770,115 | Thomas | July 8, 1930 |
| 1,816,669 | Church | July 28, 1931 |
| 1,885,228 | Buchanan | Nov. 1, 1932 |
| 2,457,235 | Hoehn | Dec. 28, 1948 |